United States Patent [19]
Fukuta et al.

[11] Patent Number: 5,985,165
[45] Date of Patent: Nov. 16, 1999

[54] PROCESS FOR THE PURIFICATION OF ALUMINUM HYDROXIDE AND PROCESS FOR THE SURFACE TREATMENT OF ALUMINUM PLATE UTILIZING THE PURIFICATION PROCESS

[75] Inventors: Hiroshi Fukuta; Tsutomu Kakei; Tadabumi Tomita; Hideki Miwa, all of Shizuoka, Japan

[73] Assignee: Fuji Photo Film Co., Ltd., Kanagawa, Japan

[21] Appl. No.: 08/742,153

[22] Filed: Oct. 31, 1996

[30] Foreign Application Priority Data

Nov. 2, 1995 [JP] Japan ................................. 7-308497

[51] Int. Cl.$^6$ ................................. B44C 1/22; C01F 7/34
[52] U.S. Cl. ........................... 216/93; 423/629; 23/301; 23/305 A; 156/64.21
[58] Field of Search .................................. 23/301, 305 A; 423/629; 216/93; 156/642.1

[56] References Cited

U.S. PATENT DOCUMENTS

| | | | |
|---|---|---|---|
| 2,935,376 | 5/1960 | Roberts, Jr. ............................ | 23/301 |
| 4,574,001 | 3/1986 | Bielfedt et al. ......................... | 423/629 |
| 4,895,627 | 1/1990 | Uesugi et al. .......................... | 204/129.75 |
| 5,163,973 | 11/1992 | Ellis ........................................ | 423/629 |
| 5,690,700 | 11/1997 | Hiralal ..................................... | 23/301 |

FOREIGN PATENT DOCUMENTS

| | | |
|---|---|---|
| 0 344 469 | 12/1989 | European Pat. Off. . |
| 0 501 458 | 9/1992 | European Pat. Off. . |
| A 52-79020 | 11/1982 | Japan . |
| A 57192300 | 10/1993 | Japan . |

OTHER PUBLICATIONS

Translation of JP 5–279,020 ( Oct. 1993.

Primary Examiner—Ngoc-Yen Nguyen
Attorney, Agent, or Firm—Sughrue, Mion, Zinn, Macpeak & Seas, PLLC

[57] ABSTRACT

The present invention allows the reproduction of a crystalline aluminum hydroxide having a high particle strength and a high purity which can find wide application such as abrasive from a supersaturated sodium aluminate solution which is being recycled in the production of aluminum hydroxide or lithographic printing plate. In a process for the purification of aluminum hydroxide which comprises the hydrolysis reaction of a supersaturated solution of sodium aluminate to crystallize aluminum hydroxide, the improvement which comprises the steps of keeping the temperature of a suspension formed by mixing a mother liquor having a total caustic soda concentration of from 50 to 700 g/l and an aluminum concentration or from 0 to 300 g/l with crystalline aluminum hydroxide at a range of from 10° C. to 200° C. for at least 1 to 48 hours, mixing the suspension with the supersaturated solution of sodium aluminate, and then causing the crystallization reaction at the crystallization reaction temperature.

15 Claims, 5 Drawing Sheets

PROCESS FOR THE PURIFICATION OF ALUMINUM HYDROXIDE AND PROCESS FOR THE SURFACE TREATMENT OF ALUMINUM PLATE UTILIZING THE PURIFICATION PROCESS

FIELD OF THE INVENTION

The present invention relates to a process for the purification of aluminum hydroxide which comprises charging a seed crystal in a crystallization reaction tank, and then allowing aluminum hydroxide to be crystallized from a supersaturated sodium aluminate solution. The present invention further relates to a process for the surface treatment of an aluminum material which comprises effecting the foregoing process for the purification of aluminum hydroxide to allow aluminum hydroxide to be crystallized from a supersaturated sodium aluminate solution while recycling the liquid used as an etching solution at an etching step to keep the aluminum ion concentration in the sodium aluminate solution at a predetermined value.

BACKGROUND OF THE INVENTION

An aluminum plate to be used as a support for lithographic printing plate is etched on the surface thereof with caustic soda before or after being mechanically or electrochemically roughened.

Further, in an electrochemical roughening process nitric acid and hydrochloric acid are used. In an anodic oxidation process, sulfuric acid is used. Thus, various processing solutions are used in the surface treatment of a support.

The variation of the aluminum ion concentration in the processing solution to be used in these surface treatment processes results in a big difference in the configuration of the surface of the support thus treated, exerting a great adverse effect on the quality of the support.

As mentioned above, the aluminum ion concentration in the processing solution has a great adverse effect on the quality of an aluminum support for printing plate. Accordingly, it is important to keep the aluminum ion concentration in the processing solution at a predetermined value.

A conventional common practice of keeping the aluminum concentration in the processing solution constant is to properly discharge the processing solution from the processing system. Another conventional common practice is to cause aluminum ions in the processing solution to be adsorbed by an ion exchange resin as mentioned in JP-A-57-192300 (The term "JP-A" as used herein means an "unexamined published Japanese patent application").

However, the external adjustment method which comprises properly discharging the processing solution from the system to keep the aluminum ion concentration constant is disadvantageous in that it requires the processing solution to be discharged from the system, resulting in a drastic increase in the consumption of the processing solution and the burden of disposal of waste liquor.

An aluminum sash is etched with caustic soda in the process for the matting of the surface thereof or the formation of an anodized film thereon for higher durability. Since this process requires a large amount of an etching solution to be used, it is necessary that aluminum hydroxide be recovered from the etching solution.

Further, various surface treatment processes such as anodic oxidation with sulfuric acid have the same disadvantages as the foregoing process for the surface treatment of an aluminum support for printing plate with respect to the disposal of waste liquor. For example, these surface treatment processes require the recovery of aluminum hydroxide from a sludge produced by the neutralization of waste liquor and the recovery of aluminum ions for the adjustment of the aluminum ion concentration of the surface treatment.

As mentioned above, in the production of alumina, lithographic printing plate or aluminum sash, the procedure of purifying a crude sodium aluminate solution in the course of the process to obtain a high purity aluminum hydroxide whereby the aluminum ion concentration of the surface treatment is properly controlled is important to prepare a high purity aluminum hydroxide from a sodium aluminate solution and recover aluminum hydroxide from an aluminum sludge produced by the process.

In the process for the preparation of alumina from bauxite, the step of obtaining a purified solution of sodium aluminate from a supersaturated sodium aluminate solution to prepare aluminum hydroxide has been heretofore carried out by a sedimentation process which comprises allowing crystalline impurities to be precipitated in a thickener to remove impurities from the supersaturated sodium aluminate solution. However, this process is disadvantageous in that the crystalline impurities are so fine that a prolonged sedimentation time and a large sedimentation area are needed, producing the necessity of a large scale facility. Further, extremely fine crystalline impurities (regarded as almost liquid) cannot be fully removed. Accordingly, it takes time as long as 42 to 72 hours to crystallize aluminum hydroxide. Moreover, the resulting purified sodium aluminate solution has a poor purity. The percent crystallization of aluminate hydroxide is not too good.

In order to separate sodium and aluminum ions from a sodium aluminate solution, diffuse dialysis using an ion exchange membrane previously proposed by the inventors may be employed to discharge aluminum ions out of the system (JP-A-1-200992). However, the diffuse dialysis is disadvantageous in that insoluble metals such as iron attached to the membrane must be removed and a scale such as aluminum hydroxide attached to the membrane on the waste liquor side thereof after diffuse dialysis must be removed once per three days by washing with an acid such as sulfuric acid, causing a rise in the running cost.

As a crystallization process for the preparation of crystalline aluminum hydroxide and a sodium aluminate solution from a supersaturated sodium aluminate solution, particularly a crystallization-process which comprises crystallizing aluminum hydroxide from a supersaturated sodium aluminate solution while the solution used is being reused as an etching solution at an etching step to keep the aluminum ion concentration of the etching solution or the like at a predetermined value, a process as disclosed in JP-A-5-279020 is known.

However, when a particulate crystalline aluminum hydroxide (normally finely divided particles having a size of from 1 $\mu$m to 150 $\mu$m unless otherwise specified) as a common industrial product or a crystalline aluminum hydroxide obtained according to a method disclosed in JP-A-5-279020 is circulated in the form of slurry by means of a pump, an external force developed by the pump may break some secondary crystals to primary crystals or further reduce the size of the primary crystals. Crystalline aluminum hydroxide may be hereinafter occasionally referred simply to as "aluminum hydroxide" unless confused.

Referring to the use of aluminum hydroxide as an abrasive, an industrially available common aluminum hydroxide or aluminum hydroxide obtained according to the method disclosed in the above cited JP-A-5-279020 shows an extremely short abrasive life as compared with other abrasives and thus must be used in a huge amount.

SUMMARY OF THE INVENTION

An object of the present invention is to provide aluminum hydroxide having a high strength and high purity which can meet a wider range of needs, in the production of aluminum hydroxide and purified sodium aluminate solution by the hydrolysis reaction of a supersaturated solution of sodium aluminate.

Another object of the present invention is to keep an aluminum ion concentration in a processing solution constant to obtain a homogeneous good quality of surface etching and surface treatment and to recycle aluminum hydroxide to be discharged in a large amount from the surface treatment step as an industrially effective material, in the case of surface treating of an aluminum plate for lithographic printing plates with etching treatment using sodium hydroxide or surface treatment using a variety of processing solutions such as acid and alkali.

These and other objects of the present invention will become more apparent from the following detailed description and examples.

The foregoing objects of the present invention are accomplished by a process for the purification of aluminum hydroxide of the present invention and a process for the surface treatment of a printing support utilizing the purification process. The present invention concerns the following processes:

(a) A process for the purification of aluminum hydroxide by the hydrolysis reaction of a supersaturated solution of sodium aluminate to crystallize aluminum hydroxide, which comprises the steps of keeping the temperature of a suspension formed by mixing a mother liquor having a total caustic soda concentration of from 50 to 700 g/l and an aluminum concentration of from 0 to 300 g/l with crystalline aluminum hydroxide at a range of from 10° C. to 200° C. for at least 1 to 48 hours, mixing said suspension with said supersaturated solution of sodium aluminate, and then causing the crystallization reaction at the crystallization reaction temperature.

(b) A process for the purification of aluminum hydroxide by the hydrolysis reaction of a supersaturated solution of sodium aluminate to crystallize aluminum hydroxide, characterized in that crystalline aluminum hydroxide which has previously been etched to have a weight loss of from 20% to 80% is used as an original seed crystal.

(c) A process for the purification of aluminum hydroxide by the hydrolysis reaction of a supersaturated solution of sodium aluminate to crystallize aluminum hydroxide, characterized in that crystalline aluminum hydroxide which has previously been ground and etched to have a weight loss of from 20% to 80% is used as an original seed crystal.

(d) A process for the-purification of aluminum hydroxide by the hydrolysis reaction of a supersaturated solution of sodium aluminate to crystallize aluminum hydroxide, characterized in that crystalline aluminum hydroxide which has previously been kept at a temperature of from 80° C. to 200° C. for at least 1 to 48 hours is used as an original seed crystal.

(e) A process for the purification of aluminum hydroxide by the hydrolysis reaction of a supersaturated solution of sodium aluminate to crystallize aluminum hydroxide, characterized in that a difficultly-etchable crystalline aluminum hydroxide is used as an original seed crystal.

(f) A process for the surface treatment of an aluminum support for printing plate which comprises a step of hydrolyzing in a crystallization reaction tank a supersaturated solution of sodium aluminate prepared by mixing a part of a processing solution containing a sodium aluminate solution to be recycled for surface etching and an aluminum sludge containing as a main component an amorphous aluminum hydroxide produced upon the neutralization of a waste acid and a waste alkali discharged from the step of surface treatment of an aluminum plate to crystallize aluminum hydroxide so that aluminum is separated out from said-part of a processing solution containing a sodium aluminate solution to be recycled for surface etching to keep the aluminum ion concentration in said processing solution constant, characterized in charging a mother liquor having a total caustic soda concentration of from 50 to 700 g/l and an aluminum concentration of from 0 to 300 g/l and crystalline aluminum hydroxide in said crystallization reaction tank, keeping the liquid temperature at a range of from 10° C. to 200° C. for at least 1 to 48 hours, supplying said supersaturated sodium aluminate solution into said crystallization reaction tank, and then causing the crystallization reaction of the reaction mixture at the crystallization reaction temperature to crystallize aluminum hydroxide while recycling the liquid used as an etching solution at the etching step.

(g) A process for the surface treatment of an aluminum support for printing plate according to Clause (f) further comprises the steps of etching crystalline aluminum hydroxide to reduce the weight thereof by from 20% to 80%, charging the crystalline aluminum hydroxide thus etched in said crystallization reaction tank as an original seed crystal, and then supplying said supersaturated sodium aluminate solution into said crystallization reaction tank to crystallize aluminum hydroxide while recycling the liquid used as an etching solution at the etching step.

(h) A process for the surface treatment of an aluminum support for printing plate according to Clause (f) further comprises the steps of grinding crystalline aluminum hydroxide to reduce the average diameter of the crystalline aluminum hydroxide to the range from 10 μm to 20 μm, charging the crystalline aluminum hydroxide thus ground in said crystallization reaction tank as an original seed crystal, and then supplying said supersaturated sodium aluminate solution into said crystallization reaction tank to crystallize aluminum hydroxide while recycling the liquid used as an etching solution at the etching step.

(i) A process for the surface treatment of an aluminum support for printing plate according to Clause (f) further comprises the steps of keeping crystalline aluminum hydroxide at a temperature of from 80° C. to 200° C. for at least 1 to 48 hours, charging the crystalline aluminum hydroxide in a crystallization reaction tank as an original seed crystal, and then supplying said supersaturated sodium alumninate solution into said crystallization reaction tank to crystallize aluminum hydroxide while recycling the liquid used as an etching solution at the etching step.

(j) A process for the surface treatment of an aluminum support for printing plate according to Clause (f) further comprises the steps of charging difficultly etchable crystalline aluminum hydroxide in a crystallization reaction tank as an original seed crystal, and then supplying said supersaturated sodium aluminate solution into said crystallization reaction tank to crystallize aluminum hydroxide while recycling the liquid used as an etching solution at the etching step.

(k) A process for the surface treatment of an aluminum material which comprises a step of hydrolyzing a supersaturated solution of sodium aluminate prepared by mixing a part of a processing solution containing a sodium aluminate solution to be recycled for surface etching and an aluminum sludge containing as a main component an amorphous aluminum hydroxide produced upon the neutralization of a waste acid and a waste alkali discharged from the step of surface treatment of an aluminum material to crystallize aluminum hydroxide so that aluminum is separated out from said part of a processing solution containing a sodium aluminate solution to be recycled for surface etching to keep the aluminum ion concentration in said processing solution constant, characterized in charging a mother liquor having a total caustic soda concentration of from 50 to 700 g/l and an aluminum concentration of from 0 to 300 g/l and crystalline aluminum hydroxide in said crystallization reaction tank, keeping the liquid temperature at a range of from 10° C. to 200° C. for at least 1 to 48 hours, supplying said supersaturated sodium aluminate solution into said crystallization reaction tank, and then causing the crystallization reaction of the reaction mixture at the crystallization reaction temperature to crystallize aluminum hydroxide while recycling the liquid used as an etching solution at the etching step.

(1) A process for the surface treatment of an aluminum material according to Clause (k) further comprises the steps of charging a seed crystal according to any one of Clauses (g) to (j) in said crystallization reaction tank as an original seed crystal, and then supplying said supersaturated sodium aluminate solution into said crystallization reaction tank to crystallize aluminum hydroxide while recycling the liquid used as an etching solution at the etching step.

BRIEF DESCRIPTION OF THE DRAWINGS

By way of example and to make the description more clear, reference is made to the accompanying drawings in which:

FIG. 6 is a scanning electron micrograph of a section of a seed crystal comprising aluminum hydroxide H-W untreated as a common industrial material, wherein the reference numeral 1 indicates a nip roll, the reference numeral 2 indicates a pass roll, the reference numeral 3 indicates a spray, the reference numeral 4 indicates a liquid feed pump, the reference numeral 5 indicates a liquid preparation tank, the reference numeral 6 indicates a rinsing tank, the reference numeral 7 indicates a precipitation tank, the reference numeral 8 indicates a thickener, the reference numeral 9 indicates a drum filter, the reference numeral 10 indicates an aluminum hydroxide hopper, the reference numeral 11 indicates an etching tank, the reference numerals 12 and 13 each indicate an etching solution recycling pipe, the reference numeral 14 indicates a return pipe, the reference numeral 15 indicates an electrolytic cell, the reference numeral 16 indicates an aluminum hydroxide sludge, the reference numeral 17 indicates a liquid feed pipe, the reference numeral 18 indicates a pipe, the reference numeral 19 indicates a water supply pipe to a dissolving tank, the reference numeral 20 indicates a recovering pipe, the reference numeral 21 indicates a sodium hydroxide supply pipe, the reference numeral 22 indicates a water replenishment pipe, the reference numeral 23 indicates an aluminum plate, the reference numeral 24 indicates an anodic oxidization electric supply tank, the reference numeral 25 indicates an anodic oxidation tank, the reference numeral 26 indicates an electrode, the reference numeral 27 indicates a pH adjustment tank, the reference numeral 28 indicates an agglomeration precipitation tank, the reference numeral 29 indicates a filter press, the reference numeral 30 indicates a wash water/waste alkaline solution, the reference numeral 31 indicates an overflow pipe for electrolytic soltion, the reference numerals 32 and 33 each indicate a wash water/waste liquid, the reference numeral 34 indicates a dissolving tank, the reference numeral 35 indicates a filter, the reference numeral 36 indicates a sludge thickener, the reference numeral 37 indicates a phosphate, the reference numeral 38 indicates an evaporating pipe, the reference numerals 39 and 44 each indicate a centrifugal sedimentating machine with a separator plate, the reference numeral 40 indicates a ball mill, the reference numeral 41 indicates a digester, the reference numeral 42 indicates a flush tank, the reference numeral 43 indicates a thickener, the reference numeral 45 indicates a crystallization reaction tank, the reference numeral 46 indicates a seed crystal dissolving tank, and the reference numeral 47 indicates an abrasive solution preparation tank.

DETAILED DESCRIPTION OF THE INVENTION

Figure 4:
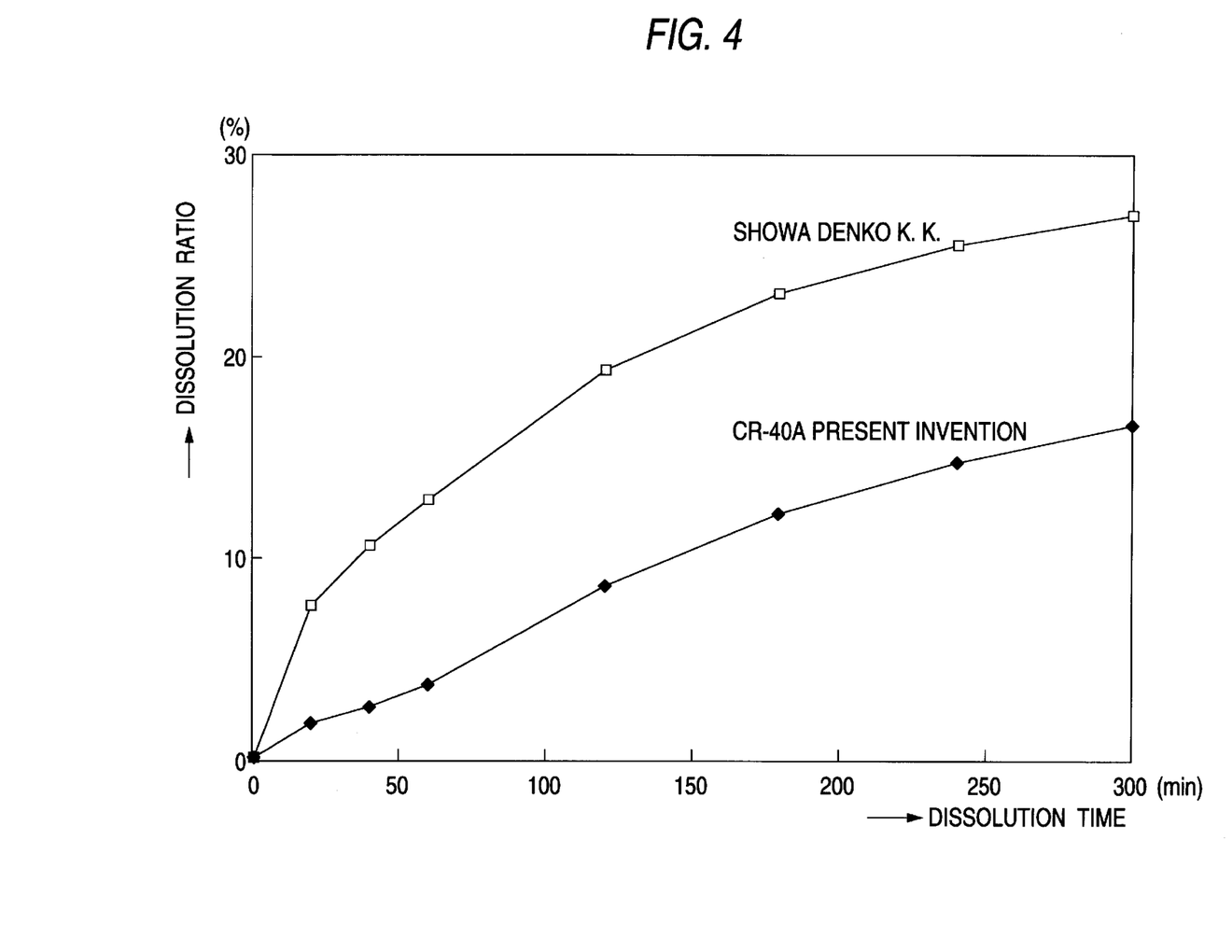
FIG. 4 is a graph illustrating the comparison in the solubility in a sodium hydroxide solution between aluminum hydroxide prepared with a seed crystal of the present invention and commercially available aluminum hydroxide.

The term "difficultly etchable crystalline aluminum hydroxide" as used herein is meant to indicate a crystalline aluminum hydroxide having a uniform crystal structure which is free of defect deep in the particle, not to mention in the surface layer, or a crystalline aluminum hydroxide having a fairly uniform crystal structure which is not fully free of but has little defect deep in the particle and has a strong strength against the external force, which crystalline aluminum hydroxide can be difficultly etched by a sodium hydroxide solution as described later in connection with FIG. 4. FIG. 4 is a graph illustrating the relationship between time and weight reduction represented by dissolution loss/ weight of raw material developed when a sample CR-40A as an example of difficultly etchable crystalline aluminum hydroxide for use in the crystallization of aluminutim hydroxide of the present invention and a crystalline aluminum hydroxide available from Showa Denko K. K. as an example of commercially available crystalline aluminum hydroxide are dissolved in a 100 g/l caustic soda solution (initial aluminum ion concentration: 0 equivalent/l) at a temperature of 65° C. It can be seen in FIG. 4 that the sample CR-40A of the present invention can be more difficultly etched by a caustic soda solution than the product available from Showa Denko K. K.

The process for the purification of aluminuitm hydroxide of the present invention according to Clause (a) will be further described hereinafter. In the purification process according to Clause (a), a mother liquor having a total caustic soda concentration of from 50 to 700 g/l and an aluminum concentration of from 0 to 300 g/l is charged in a crystallization reaction tank. The liquid temperature is then adjusted to a range of from 10° C. to 200° C. A crystalline aluminum hydroxide is then charged in the crystallization reaction tank so that the aluminum concentration reaches a predetermined value where the solution is then kept for a predetermined period of time so that the crystalline aluminum hydroxide is partially dissolved. Thereafter, a supersaturated sodium aluminate solution is supplied into the crystallization reaction tank. The reaction system is then adjusted to the crystallization reaction temperature to cause crystallization. Alternatively, a crystalline aluminum hydroxide is charged in the crystallization reaction tank. The solution concentration and temperature are then adjusted to the above defined range. A mother liquor having the foregoing composition is then added to the reaction system. The reaction system is then kept for a predetermined period of time so that the crystalline aluminum hydroxide is partially dissolved. A supersaturated sodium aluminate solution is supplied into the reaction system which is then adjusted to the crystallization reaction temperature to cause crystallization.

The process for the purification of aluminum hydroxide according to Clause (a) will be further described hereinafter.

In the purification process according to Clause (b), aluminum hydroxide is etched in a caustic soda solution at a seed crystal dissolution step. It can be presumed that when etched in a caustic soda solution, aluminum hydroxide is broken to primary crystals or dissolved at defect-ridden portion, resulting in the production of a difficultly etchable aluminum hydroxide.

Further, in the purification process according to Clause (c), the etching in a caustic soda solution in the purification process according to Clause (b) is preceded by the grinding of aluminum hydroxide to a predetermined size by means of a grinder to make the material easily etchable. Thereafter, the material is etched in a caustic soda solution at a seed crystal dissolution step. As a result, a difficultly etchable aluminum hydroxide can be obtained.

In the purification process according to Clause (d), aluminum hydroxide is heated to a predetermined temperature in the form of powder in an electric furnace, and then kept at the same temperature. As a result, a difficultly etchable aluminum hydroxide can be obtained.

It can be presumed that the etching of aluminum hydroxide in a caustic soda solution at a seed crystal dissolution step according to the treatment process defined in Clauses (b) and (c) results in the production of a difficultly etchable aluminum hydroxide as mentioned above.

The foregoing aluminum hydroxide which can be difficultly etched or presumed to be difficultly etched can undergo hydrolyzation reaction as a seed crystal in a supersaturated soda aluminate solution in a crystallization reaction tank to cause the crystallization of aluminum hydroxide from the supersaturated soda aluminate solution, making it possible to obtain a high purity aluminum hydroxide which has little defect and exhibits a high strength against the external force and thus can meet a wider range of needs.

In the process for the surface treatment of an aluminum plate or aluminum material of the present invention, a supersaturated sodium aluminate solution prepared from an aluminum sludge comprising as main components a part of a processing solution containing a sodium aluminate solution to be recycled to the surface etching step and an amorphous aluminum hydroxide produced by the neutralization of a waste acid and a waste alkali discharged from the surface treatment step can be subjected to the process for the purification of aluminum hydroxide of the present invention to obtain a high strength and purity aluminum hydroxide which can meet a wider range of needs. In the process for the surface treatment of an aluminum plate or aluminum material of the present invention, a process described in JP-A-5-279020 can further be applied to remove an impurity from the supersaturated sodium aluminate solution, before the process for the purification of aluminum hydroxide of the present invention. According to this embodiment, aluminum hydroxide having more intensed strength and higher purity, and meeting a wider range of needs can be obtained.

As mentioned above, the process for the surface treatment of an aluminum plate or aluminum material of the present invention allows the production of a high purity homogeneous aluminum hydroxide from a supersaturated sodium aluminate solution. This means that a high purity homogeneous sodium hydroxide solution can be recovered, making a great contribution to the stabilization of the entire surface treatment step.

Referring to aluminum hydroxide thus recovered, if used as an abrasive for example, it has a longer life than industrially available common aluminum hydroxide and thus can meet a wider range of needs.

Figure 1:
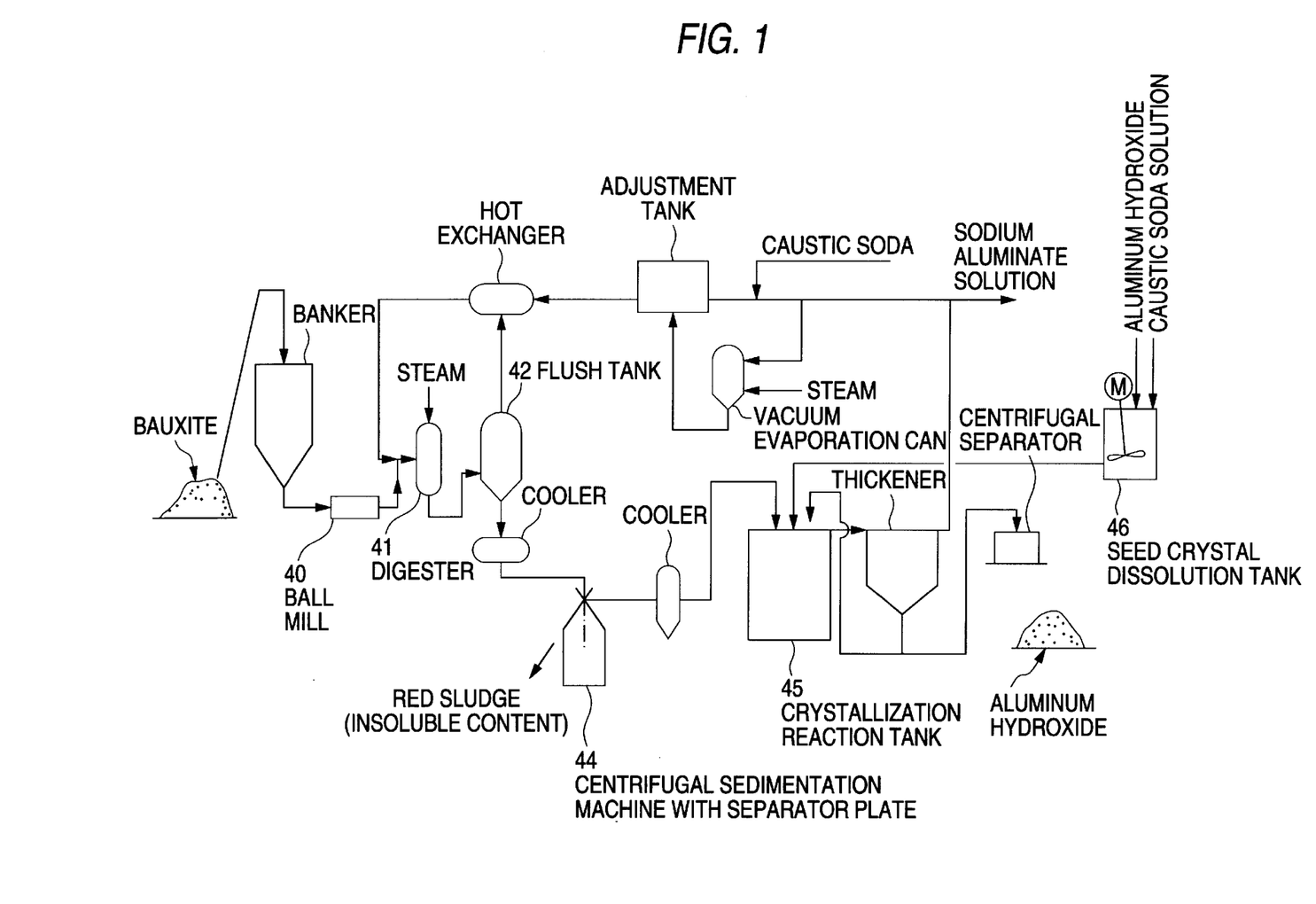
FIG. 1 is a schematic diagram illustrating the configuration of a novel process for the preparation of alumina by the process for the purification of aluminum hydroxide of the present invention employing a seed crystal which has been previously prepared by the process according to the present invention.

In the process for the preparation of aluminum hydroxide from bauxite of the present invention shown in FIG. 1, a sodium aluminate solution prepared in a flush tank 42 is subjected to centrifugal sedimentation by means of a centrifugal sedimentation machine with a separator plate to remove impurities therefrom. The resulting supersaturated sodium aluminate solution is then supplied into a crystallization reaction tank 45. Separately, a seed crystal has been prepared in a seed crystal dissolution tank 46. The seed crystal is then supplied into the crystallization reaction tank 45. Under these conditions, the supersaturated sodium aluminate solution undergoes hydrolyzation in the crystallization reaction tank 45 to cause the crystallization of aluminum hydroxide. The technique of preparation of a seed crystal according to Clauses (a) to (c) is effected in the seed crystal dissolution tank 46. In the process according to Clause (d), aluminum hydroxide is heated in the air in the form of powder.

Figure 2:
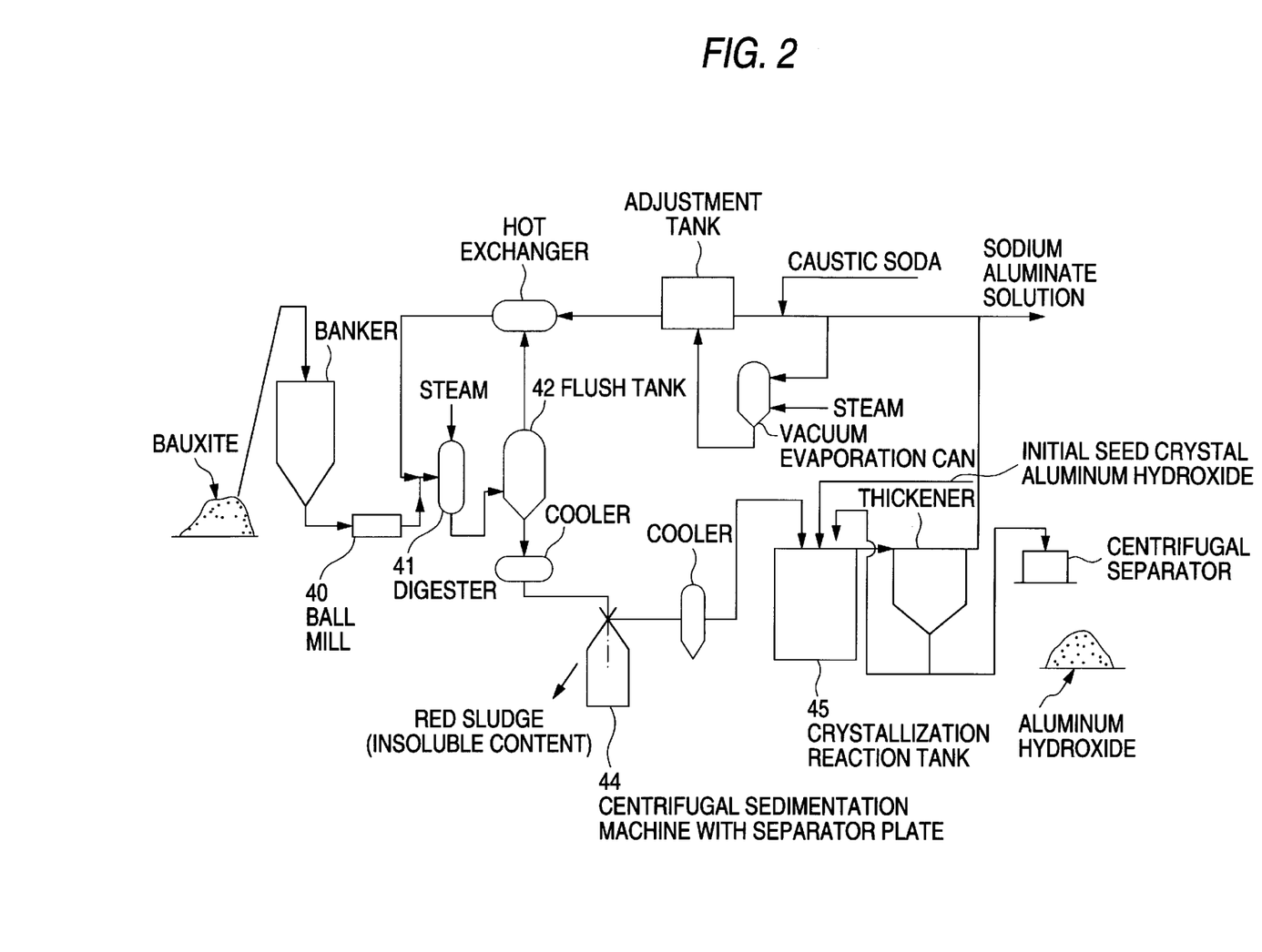
FIG. 2 is a schematic diagram illustrating the configuration of a novel process for the preparation of alumina by the process for the purification of aluminum hydroxide of the present invention employing a difficultly etchable seed crystal.

In the process for the preparation of aluminum hydroxide of the present invention from bauxite shown in FIG. 2, a difficultly etchable seed crystal which has been previously prepared is added as an original seed crystal aluminum hydroxide to cause the crystallization of aluminum hydroxide (This is an example of the application of the process for the purification of aluminum hydroxide according to Clause (e)).

The process for the surface treatment of an aluminum support for printing plate of the present invention according to Clauses (f) to (i) will be further described in connection with FIG. 3.

Figure 3:
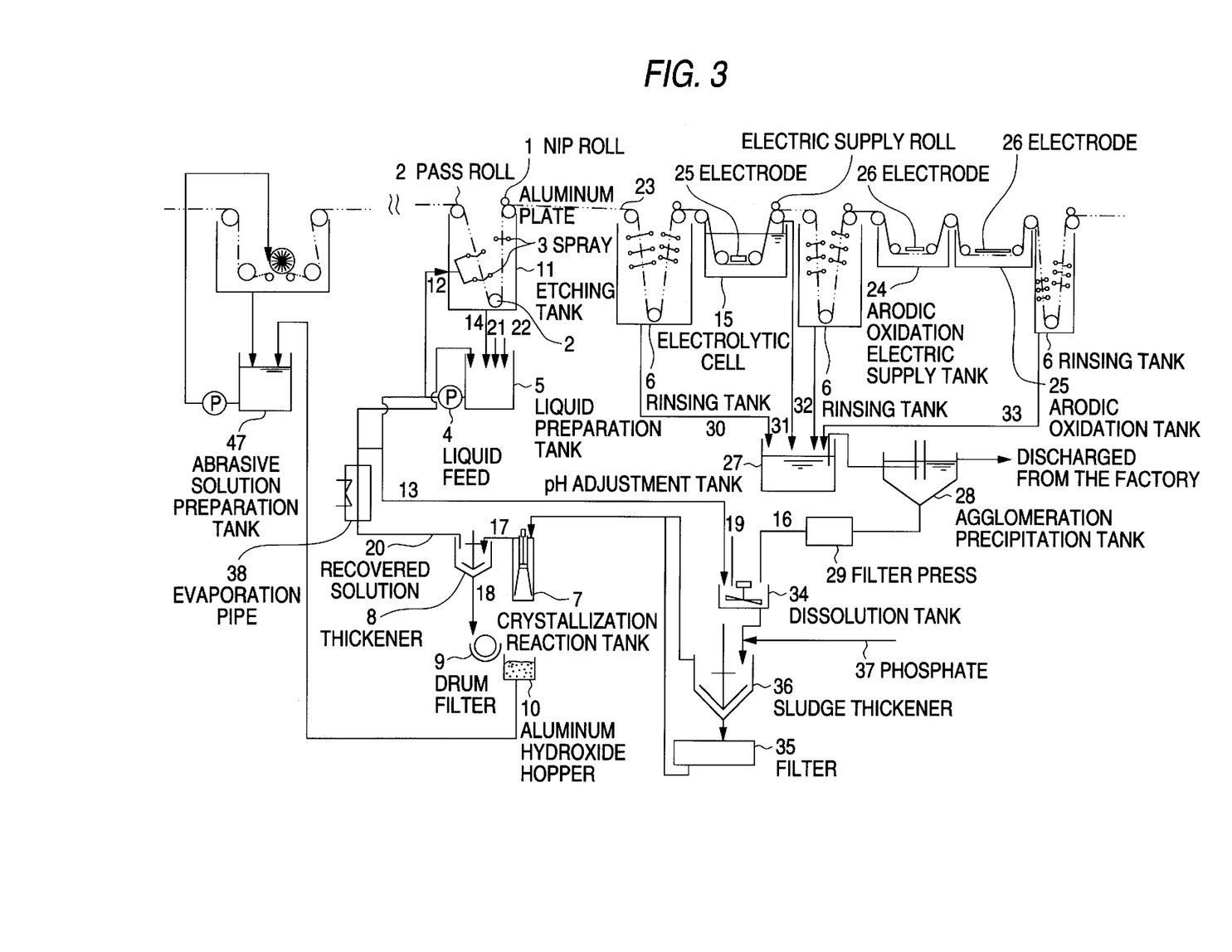
FIG. 3 is a schematic diagram illustrating the configuration of a process for the surface treatment of an aluminum support for printing plate by the process for the purification of a sodium aluminate solution of the present invention.

In the etching step in an etching tank 11 in the surface treatment process of the present invention shown in FIG. 3, the processing solution is prepared in a liquid preparation tank 5. The processing solution thus prepared is then supplied into a spray 3 in the etching tank 11 through a liquid feed pipe 12 by means of a liquid feed pump 4.

The etching solution from the liquid preparation tank 5 may also be supplied into a dissolution tank 34 through a liquid feed pipe 13 which is branched from the liquid feed pipe 12. The liquid supply rate and the time during which liquid supply is effected can be adjusted by operating a valve (not shown) disposed in the course of the pipe.

The liquid preparation tank 5 and the etching tank 11 are connected to each other via the liquid feed pipe 12 and a return pipe 14. The etching solution is circulated through this system. During the etching process, the content of sodium hydroxide in the processing solution is reduced by the reaction while the aluminum ion content in the processing solution is increased. Further, the water content is reduced by evaporation. Thus, the processing solution shows a change in its amount and the content of various components. Therefore, the processing solution in the liquid preparation tank 5 is replenished with a sodium hydroxide solution and water through replenishment pipes 21 and 22, respectively. However, it is much uneconomical to keep the aluminum ion concentration of the processing solution by replenishment without removing the increasing aluminum ions.

Accordingly, a part of the processing solution which is being recycled to the liquid preparation tank 5 through the liquid feed pipe 13 is passed to the dissolution tank 34 at a proper time to remove aluminum ions from the system. On the other hand, aluminum sludge 16 neutralizes a waste alkali 30 and waste acids 31, 32 and 33 discharged from the various surface treatment steps in a pH adjustment tank 27, and then undergoes agglomeration and precipitation in an agglomeration precipitation tank 28. The aluminum sludge 16 undergoes solid-liquid separation in a filter press 29 and is then passed to the dissolution tank 34 at a proper time.

In the dissolution tank 34, the etching solution, aluminum sludge 16, and optionally water 19 were mixed to prepare a supersaturated sodium aluminate solution. If necessary, impurities such as calcium are removed by means of a sludge thickener 36 and a filter 35. The supersaturated sodium aluminate solution which has thus been freed of impurities is then supplied into the crystallization reaction tank 7.

In the process for the surface treatment of an aluminum support for printing plate of the present invention according to Clauses (f) to (i), a seed crystal which has been prepared in a separate seed crystal dissolution tank (not shown) according to the process defined in Clauses (a) to (c) is supplied into the crystallization reaction tank 7. Thereafter, a supersaturated sodium aluminate solution is charged in the crystallization reaction tank 7 in which it undergoes hydrolyzation reaction to cause the crystallization of aluminum hydroxide. Thus, a mixture of sodium hydroxide as a main component with crystalline aluminum hydroxide having a reduced aluminum ion concentration is recovered. The mixture of a processing solution containing sodium hydroxide as a main component and crystalline aluminum hydroxide is then passed to a thickener 8 through a liquid feed pipe 17. Aluminum hydroxide thus crystallized is passed through a pipe 18 to a drum filter 9 so that it is separated. Aluminum hydroxide thus separated is then collected by a hopper 10. On the other hand, the processing solution containing sodium hydroxide as a main component is passed as a recovered solution through a recovering pipe 20, and then returned to the liquid preparation tank 5 optionally after being adjusted in concentration.

On the other hand, aluminum hydroxide collected by the hopper 10 is then supplied into an abrasive solution preparation tank 47 as an abrasive for mechanical roughening process as necessary.

The process for the surface treatment of an aluminum support for printing plate of the present invention according to Clause (j) is the same as the process for the surface treatment of an aluminum support for printing plate of the present invention according to Clauses (f) to (i) except that the seed crystal to be added to the crystallization reaction tank 7 is a difficultly etchable seed crystal which has been previously prepared.

The present invention will be further described in the following examples, but the present invention should not be construed as being limited thereto.

EXAMPLE 1

Using an apparatus having a configuration shown in FIG. 3, an aluminum plate was subjected to surface treatment while aluminum hydroxide sludge was being modified under the following conditions. The results will be given below.

Conditions for Surface Treatment of Aluminum
    Width of aluminum plate: 1,000 mm
    Processing speed: 50 m/min.
Conditions for Crystallization
    Temperature in crystallization tank: 55° C.
    Concentration of crystallizable solution:
        Total NaOH concentration: 100 g/l
        Aluminum concentration: 20 g/p
    Concentration of crystallizing seed crystal: 100 g/l
Conditions of Original Seed Crystal
    Aluminum hydroxide: H-W (available from Showa Denko K. K.)
    Concentration of seed crystal solution:
        Total NaOH concentration: 100 g/l
        Aluminum concentration: 0 g/l (before dissolution)
    Temperature of seed crystal solution: 75° C.

Figure 5:
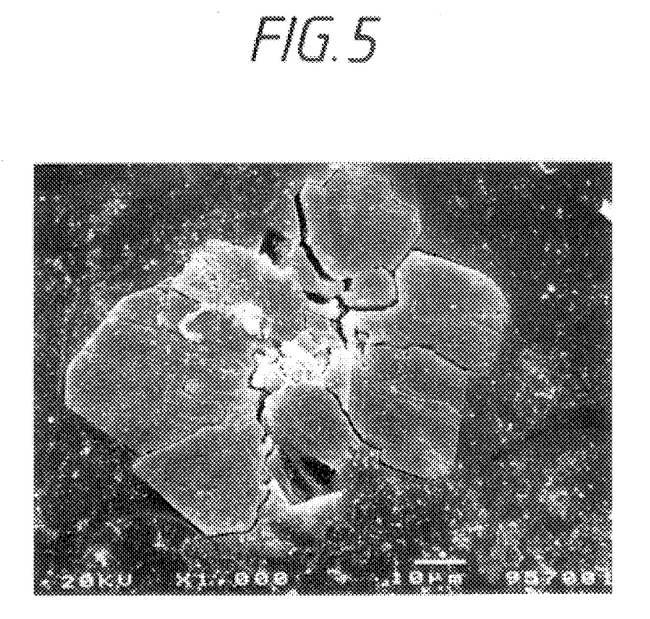
FIG. 5 is a scanning electron micrograph of a section of a seed crystal obtained by caustic soda treatment of aluminum hydroxide H-W as a common industrial material.

FIG. 5 is a scanning sectional electron micrograph illustrating the crystal structure of a seed crystal (aluminum hydroxide) obtained by treating H-W (available from Showa Denko K. K.) as an industrially available original seed crystal at a temperature of 75° C. in a mother liquor having a total NaOH concentration of 100 g/l and an aluminum concentration of 0 g/l for 10 minutes.

COMPARATIVE EXAMPLE 1

Using the apparatus shown in FIG. 3, an aluminum plate was subjected to surface treatment while aluminum hydroxide sludge was being modified with aluminum hydroxide as a common industrially available original seed crystal for comparison with Example 1. The results will be given below.

Conditions for Surface Treatment of Aluminum
    Width of aluminum plate: 1,000 mm
    Processing speed: 50 m/min.
Conditions for Crystallization
    Temperature in crystallization tank: 55° C.
    Concentration of crystallizable solution:
        Total NaOH concentration: 100 g/l
        Aluminum concentration: 20 g/l
    Concentration of crystallizing seed crystal: 100 g/l
Conditions of Original Seed Crystal
    Aluminum hydroxide:
        H-W (available from Showa Denko K. K.) (used as it is)

TABLE 1

Figure 6:
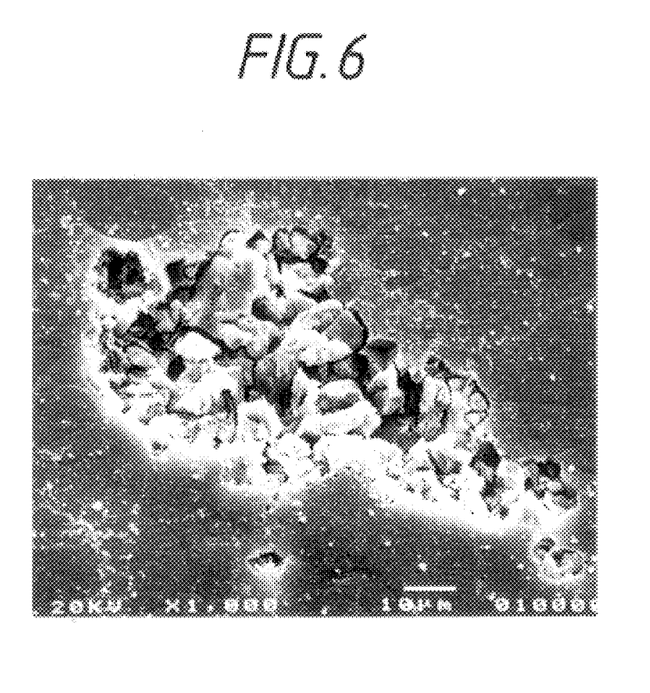

| Purification process | Crystal structure of aluminum hydroxide (SEM) | Abrasive life of aluminum hydroxide |
| --- | --- | --- |
| Example 1 | FIG. 5 | Abrasive life 1 |
| Comparative Example 1 | FIG. 6 | Abrasive life 1/10 |

FIG. 6 is a scanning sectional electron micrograph illustrating the crystal structure of aluminum hydroxide of the comparative example obtained with aluminum hydroxide as a common industrially available original seed crystal.

The object of the scanning sectional electron micrograph shown in FIGS. 5 and 6 was a crystal obtained by a process which comprises embedding aluminum hydroxide in a resin, buffing the embedded aluminum hydroxide, etching the material with an about 10% caustic soda solution for 10 minutes, washing the material with an about 10% nitric acid solution for 1 minute, and then washing the material with water.

The process for the purification of aluminum hydroxide of the present invention which comprises allowing a supersaturated sodium aluminate solution to undergo hydrolyzation reaction to cause the crystallization of aluminum hydroxide and the process for the surface treatment of an aluminum support for printing plate of the present invention which comprises such a procedure have the following advantages:

(1) Aluminum hydroxide thus obtained has an unprecedentedly high strength. Thus, the secondary crystal can be hardly destroyed by external force. Moreover, aluminum hydroxide obtained by the present invention contains less impurity (0.2 weight %) and has larger whiteness (97%) than the conventional aluminum hydroxide. Thus, aluminum hydroxide products having a wider range of properties can be put on the market as industrial materials.

(2) When aluminum hydroxide thus obtained is used as an abrasive for the surface treatment of aluminum, it exhibits a drastically increased abrasive life as compared with common industrially available aluminum hydroxide.

As mentioned above, the process of the present invention makes a great contribution to the improvement of quality of aluminum hydroxide and the reduction of the cost of the facility for the surface treatment of an aluminum plate.

While the invention has been described in dretail and with reference to specific embodiments thereof, it will be apparent to one skilled in the art that various changes and modifications can be made therein without departing from the spirit and scope thereof.

What is claimed is:

1. A process for obtaining highly pure aluminum hydroxide by the hydrolysis reaction of a supersaturated solution of sodium aluminate to crystallize aluminum hydroxide, which comprises the steps of keeping the temperature of a suspension formed by mixing a mother liquor having a total caustic soda concentration of from 50 to 700 g/l and an aluminum concentration of from 0 to 300 g/l with crystalline aluminum hydroxide at a range of from 10° C. to 200° C. for at least 1 to 48 hours, resulting in an aluminum hydroxide seed crystal concentration of 100 g/l in said suspension, mixing said suspension with said supersaturated solution of sodium aluminate, and then causing, by hydrolysis, the crystallization of aluminum hydroxide.

2. A process for obtaining highly pure aluminum hydroxide by the hydrolysis reaction of a supersaturated solution of sodium aluminate to crystallize aluminum hydroxide, wherein crystalline aluminum hydroxide which has previously been etched to have a weight loss of from 20% to 80% is used as an original seed at a concentration of 100 g/l.

3. A process for obtaining highly pure aluminum hydroxide by the hydrolysis reaction of a supersaturated solution of sodium aluminate to crystallize aluminum hydroxide, wherein crystalline aluminum hydroxide which has previously been ground and etched to have a weight loss of from 20% to 80% is used as an original seed at a concentration of 100 g/l.

4. A process for obtaining highly pure aluminum hydroxide by the hydrolysis reaction of a supersaturated solution of sodium aluminate to crystallize aluminum hydroxide, wherein crystalline aluminum hydroxide which has previously been kept at a temperature of from 80° C. to 200° C. for at least 1 to 48 hours is used as an original seed at a concentration of 100 g/l.

5. A process for obtaining highly pure aluminum hydroxide by the hydrolysis reaction of a supersaturated solution of sodium aluminate to crystallize aluminum hydroxide, wherein a difficulty-etchable crystalline aluminum hydroxide is used as an original seed at a concentration of 100 g/l.

6. A process for the surface treatment of an aluminum support for a printing plate which comprises the steps of:
   a. surface treating an aluminum support for a printing plate with a processing solution in an etching tank;
   b. withdrawing a portion of the processing solution and mixing it with an aluminum sludge, containing as a main component an amorphous aluminum hydroxide produced upon the neutralization of a waste acid and a waste alkali discharged from the step of surface treatment of the aluminum support, to form a supersaturated solution of sodium aluminate;
   c. crystallizing, by hydrolysis, said supersaturated solution in a crystallization reaction tank to form crystalline aluminum hydroxide and a spent solution; wherein a suspension containing crystalline aluminum hydroxide at a concentration of 100 g/l is used as seed during the crystallizing step, said suspension being formed prior to the crystallizing step by charging a mother liquor having a total caustic soda concentration of from 50 to 700 g/l and an aluminum concentration of from 0 to 300 g/l and crystalline aluminum hydroxide in said crystallization reaction tank, and keeping the resulting mixture at a temperature ranging from 10° C. to 200° C. for at least 1 to 48 hours; and
   d. reusing the spent solution as part of the processing solution in the surface treating step.

7. A process for the surface treatment of an aluminum support for a printing plate according to claim 6, which further comprises the steps of etching crystalline aluminum hydroxide to reduce the weight thereof by from 20% to 80%, and charging the etched crystalline aluminum hydroxide in said crystallization reaction tank as an original seed at a concentration of 100 g/l instead of said suspension containing crystalline aluminum hydroxide and prior to said crystallizing step.

8. A process for the surface treatment of an aluminum support for a printing plate according to claim 6, which further comprises the steps of grinding crystalline aluminum hydroxide to reduce the average diameter of the crystalline aluminum hydroxide to the range from 10 μm to 20 μm, and charging the ground crystalline aluminum hydroxide in said crystallization reaction tank as an original seed at a concentration of 100 g/l instead of said suspension containing crystalline aluminum hydroxide and prior to said crystallizing step.

9. A process for the surface treatment of an aluminum support for a printing plate according to claim 6, which further comprises the steps of keeping crystalline aluminum hydroxide at a temperature of from 80° C. to 200° C. for at least 1 to 48 hours, and charging the thus kept crystalline aluminum hydroxide in said crystallization reaction tank as an original seed at a concentration of 100 g/l instead of said suspension containing crystalline aluminum hydroxide and prior to said crystallizing step.

10. A process for the surface treatment of an aluminum support for a printing plate according to claim 6, which further comprises the step of charging difficultly etchable crystalline aluminum hydroxide in said crystallization reaction tank as an original seed at a concentration of 100 g/l instead of said suspension containing crystalline aluminum hydroxide and prior to said crystallizing step.

11. A process for the surface treatment of an aluminum material which comprises the steps of:
 a. surface treating an aluninum material with a processing solution in an etching tank;
 b. withdrawing a portion of the processing solution and mixing it with an aluminum sludge, containing as a main component an amorphous aluminum hydroxide produced upon the neutralization of a waste acid and a waste alkali discharged from the step of surface treatment of the aluminum material, to form a supersaturated solution of sodium aluminate;
 c. crystallizing, by hydrolysis, said supersaturated solution in a crystallization reaction tank to form crystalline aluminum hydroxide and a spent solution; wherein a suspension containing crystalline aluminum hydroxide at a concentration of 100 g/l is used as seed during the crystallizing step, said suspension being formed prior to the crystallizing step by charging a mother liquor having a total caustic soda concentration of from 50 to 700 g/l and an aluminum concentration of from 0 to 300 g/l and crystalline aluminum hydroxide in a crystallization reaction tank, and keeping the resulting mixture at a temperature ranging from 10° C. to 200° C. for at least 1 to 48 hours; and
 d. reusing the spent solution as part of the processing solution in the surface treating step.

12. A process for the surface treatment of an aluminum material according to claim 11, which further comprises the steps of etching crystalline aluminum hydroxide to reduce the weight thereof by from 20% to 80%, and charging the etched crystalline aluminum hydroxide in said crystallization reaction tank as an original seed at a concentration of 100 g/l instead of said suspension containing crystalline aluminum hydroxide and prior to said crystallizing step.

13. A process for the surface treatment of an aluminum material according to claim 11, which further comprises the steps of grinding crystalline aluminum hydroxide to reduce the average diameter of the crystalline aluminum hydroxide to the range from 10 µm to 20 µm, and charging the ground crystalline aluminum hydroxide in said crystallization reaction tank as an original seed at a concentration of 100 g/l instead of said suspension containing crystalline aluminum hydroxide and prior to said crystallizing step.

14. A process for the surface treatment of an aluminum material according to claim 11, which further comprises the steps of keeping crystalline aluminum hydroxide at a temperature of from 80° C. to 200° C. for at least 1 to 48 hours, and charging the thus kept crystalline aluminum hydroxide in said crystallization reaction tank as an original seed at a concentration of 100 g/l instead of said suspension containing crystalline aluminum hydroxide and prior to said crystallizing step.

15. A process for the surface treatment of an aluminum material according to claim 11, which further comprises the step of charging difficultly etchable crystalline aluminum hydroxide in said crystallization reaction tank as an original seed at a concentration of 100 g/l instead of said suspension containing crystalline aluminum hydroxide and prior to said crystallizing step.

* * * * *